(12) United States Patent
Haga

(10) Patent No.: US 12,166,349 B2
(45) Date of Patent: Dec. 10, 2024

(54) POWER SUPPLY DEVICE

(71) Applicant: HONDA MOTOR CO., LTD., Tokyo (JP)

(72) Inventor: Hisao Haga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 18/136,895

(22) Filed: Apr. 20, 2023

(65) Prior Publication Data
US 2023/0411962 A1 Dec. 21, 2023

(30) Foreign Application Priority Data
Jun. 17, 2022 (JP) ................. 2022-098126

(51) Int. Cl.
| | | |
|---|---|---|
| *B64D 35/02* | (2024.01) | |
| *B60L 50/51* | (2019.01) | |
| *B60L 50/60* | (2019.01) | |
| *B60L 50/61* | (2019.01) | |
| *B60L 58/12* | (2019.01) | |
| *B64D 35/024* | (2024.01) | |
| *H02J 3/00* | (2006.01) | |
| *H02J 7/00* | (2006.01) | |

(52) U.S. Cl.
CPC ............. *H02J 3/007* (2020.01); *B60L 50/51* (2019.02); *B60L 50/61* (2019.02); *B60L 50/66* (2019.02); *B60L 58/12* (2019.02); *B64D 35/024* (2024.01); *H02J 7/0048* (2020.01); *H02J 2310/44* (2020.01)

(58) Field of Classification Search
CPC .......... B60L 50/51; B60L 50/60; B60L 50/61; B60L 50/66; B60L 58/12; B64D 27/357; B64D 31/18; B64D 35/024; H02J 7/0048; H02J 7/0049; H02J 2310/44
See application file for complete search history.

(56) References Cited

U.S. PATENT DOCUMENTS

| | | | |
|---|---|---|---|
| 2015/0202978 A1* | 7/2015 | Hatanaka | B60L 50/61 701/19 |
| 2019/0359064 A1* | 11/2019 | Wilhide | H03K 3/45 |
| 2020/0290742 A1* | 9/2020 | Kumar | B64D 35/024 |
| 2023/0234717 A1* | 7/2023 | Sato | B64D 27/24 701/3 |

FOREIGN PATENT DOCUMENTS

JP 2000-324871 11/2000

\* cited by examiner

*Primary Examiner* — Levi Gannon
(74) *Attorney, Agent, or Firm* — Amin, Turocy & Watson, LLP

(57) ABSTRACT

A power supply device includes a power generator, a drive source, a plurality of power supply lines, a plurality of batteries, a current value calculation part 11, a demanded battery power calculation part 12, and a power summation part 13. The current value calculation part 11 calculates the C-rates CR1, CR2, CR3 and CR4 of the batteries based on the charge levels of the batteries. The demanded battery power calculation part 12 calculates a demanded power P or Q of the batteries based on the calculated C-rates CR1, CR2, CR3 and CR4 and the capacities of the batteries. The power summation part 13 sums the demanded power P or Q of the batteries and power demanded by electrical loads. The control unit 9 controls the drive source such that the power generator generates power calculated by the power summation part 13.

4 Claims, 4 Drawing Sheets

POWER SUPPLY DEVICE

CROSS-REFERENCE TO RELATED APPLICATION

Priority is claimed on Japanese Patent Application No. 2022-098126, filed Jun. 17, 2022, the content of which is incorporated herein by reference.

BACKGROUND OF THE INVENTION

Field of the Invention

The present invention relates to a power supply device.

Description of Related Art

Of power supply devices or the like for airplanes, a power supply device that includes a drive source, a power generator, a plurality of batteries, and a motor driven by power from the power generator or the batteries is known in the related art. For such power supply devices, various techniques have been proposed to perform control for balancing the charge levels of a plurality of batteries.

For example, Patent Document 1 (Japanese Unexamined Patent Application, First Publication No. 2000-324871) discloses a configuration of a power supply device including a preferential battery current command determination unit that detects the states of charge of a plurality of batteries and determines the priority level of power supply to each battery based on the detected state of charge of the battery. The preferential battery current command determination unit preferentially controls two command values among a current command value of a battery with a high voltage among a plurality of batteries, a current command value of a battery with a low voltage, and a torque command value of torque required to drive a motor and thus controls the other command value subordinately.

This can balance the charge levels of batteries and improve battery performance, according to the technology described in Patent Document 1.

SUMMARY OF THE INVENTION

However, in the technique described in Patent Document 1, power distribution to each battery is determined based on the charge level of the battery. That is, it is necessary to calculate the power required for each battery and further to determine the priority level, which may make the configuration of the control system complicated. Further, a device for transferring power between the plurality of batteries is required, which may complicate the control device and increase the cost. Furthermore, precise control is required to keep the charge levels of the batteries within a predetermined value range, such that control becomes even more complicated. This may make the control device complicated and expensive.

Therefore, it is an object of the present invention to provide a power supply device capable of balancing the charge levels of a plurality of batteries while limiting complication of the control system compared to the related art.

To achieve the above object, the power supply device according to the present invention has the following configuration.

(1) A power supply device according to an aspect of the present invention includes a power generator, a drive source configured to drive the power generator, a plurality of power supply lines that supply the power generated by the power generator to a plurality of electrical loads, a plurality of batteries connected to the power supply lines, the plurality of batteries being upstream of the electrical loads in a power supply direction, a current value calculation part configured to calculate current values that can be passed through the batteries based on charge levels of the batteries, a demanded battery power calculation part configured to calculate a demanded power of the batteries based on the current values calculated by the current value calculation part and capacities of the batteries, and a power summation part configured to sum the power calculated by the demanded battery power calculation part and power demanded by the electrical loads, wherein the drive source is controlled such that the power generator generates power calculated by the power summation part.

(2) The power supply device according to the above aspect (1) may further include an operating state detection part configured to detect operating states of the plurality of power supply lines and the amount of power to be generated by the power generator may be controlled based on the operating states of the power supply lines detected by the operating state detection part.

(3) In the power supply device according to the above aspect (1) or (2), the power supply device may be a power source for an electrically propelled aircraft and each of the electrical loads may be an electric motor that rotates a propeller of the aircraft.

Advantages

According to aspect (1), power generated by the power generators is supplied to the plurality of batteries through the power supply lines. The power supply device includes the current value calculation part that calculates current values that can be passed through the batteries, the demanded battery power calculation part that calculates the demanded power based on the battery capacity and the current values calculated by the current value calculation part, and the power summation part that sums the demanded power and power demanded by the electrical loads. The drive sources are controlled such that the power generators generate the power calculated by the power summation part. Accordingly, it is possible to easily calculate power to be generated by the power generators (power to be generated) based on current values that can be passed through the batteries and the battery capacity. In the power supply device, the power generated by the power generators is distributed to the power supply lines according to the potential differences of the batteries. Thus, the plurality of batteries can be charged such that the charge levels of the batteries are uniform regardless of the potential differences of the batteries. Further, even if the outputs (power consumption) of the electrical loads on the power supply lines differ from each other, a battery with a lower charge level can be charged preferentially. This can increase the output of an electrical load connected to the same power supply line as that having the battery with a lower charge level. As a result, the outputs of the power supply lines can be balanced and variations in the outputs of the electrical loads can be corrected. That is, the charge levels of the batteries can be balanced regardless of the outputs of the electrical loads. Thus, stable control becomes possible.

For example, a control device or the like for managing (controlling) charging and discharging of each battery becomes unnecessary in contrast to the related art in which charging and discharging is controlled for each battery. This can reduce the cost of the power supply device. Thus, the charge levels of the plurality of batteries can be balanced with a simpler and less expensive configuration than the related art.

Accordingly, it is possible to provide a power supply device capable of balancing the charge levels of the plurality of batteries while limiting complication of the control system compared to the related art.

Since a battery with a lower charge level is charged preferentially, overdischarging of the battery with a lower charge level can be limited. Since power supply to a battery with a relatively large charge level is limited, overcharging of the battery with the relatively large charge level can be limited. Accordingly, the batteries can be used within an optimal usage range and deterioration of the battery can be limited.

Further, since power is not transferred between the plurality of batteries, complication of the control system can be limited compared to the related art in which power is transferred between the batteries. Controlling the charging and discharging of the batteries only with power from the power generators without transferring power between the batteries can improve the efficiency of charging and discharging.

According to aspect (2), the power supply device further includes the operating state detection part that detects the operating states of the power supply lines, and the power to be generated by the power generators is controlled based on the operating states of the power supply lines. Thus, for example, when a problem such as a failure has occurred in one of the batteries, it is possible to limit power supply to a power supply line in which the problem has occurred. Further, performing control or the like for subtracting the amount of power for the power supply line to which power supply has been stopped from the power to be generated can limit overcharging of the normal power supply lines. Accordingly, it is possible to provide a power supply device with high versatility that can cope with accidents or problems such as failures.

According to aspect (3), the power supply device is used as a power source for the electrically propelled aircraft. Here, in an aircraft that flies by rotating a plurality of propellers, power consumed by each power supply line tends to vary greatly depending on the weather, the attitude of the aircraft, and the like. Therefore, the power supply device can be more effectively used especially when it is applied to an aircraft having a large difference between powers demanded by the electrical loads (electric motors) on the power supply lines. That is, power can be supplied according to the power consumption of each power supply line or the like including a battery.

Since power from the power generators is distributed according to the demanded power of each power supply line, control of the aircraft can be facilitated.

DETAILED DESCRIPTION OF THE INVENTION

Hereinafter, embodiments of the present invention will be described with reference to the drawings.
(Aircraft)

Figure 1:
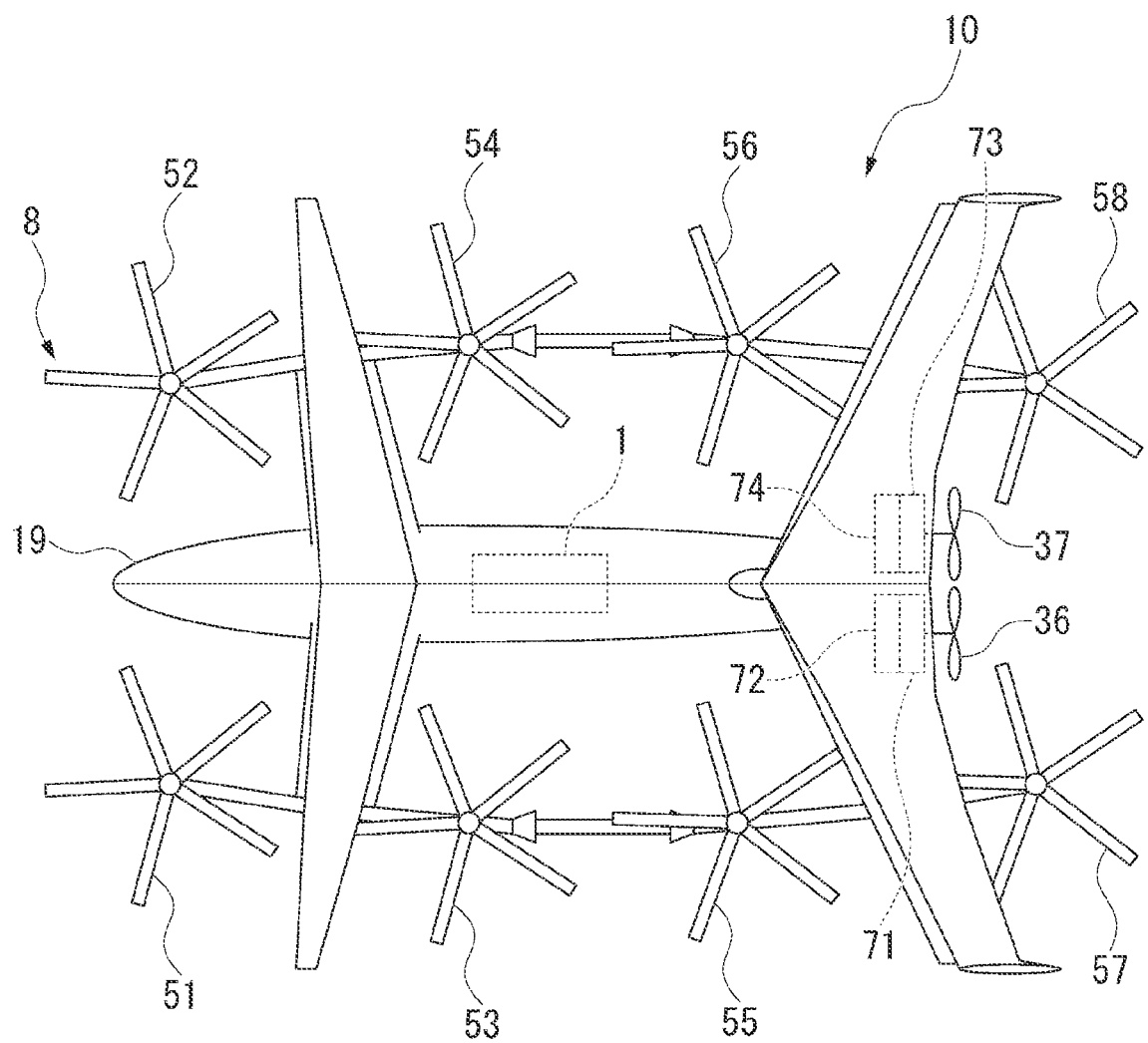
FIG. 1 is an external view of an aircraft provided with a power supply device according to an embodiment.

FIG. 1 is an external view of an aircraft 10 provided with a power supply device 1 according to an embodiment.

The aircraft 10 is, for example, an electrically propelled airplane that flies by rotating a plurality of propellers 8. The aircraft 10 includes an airframe 19 and the power supply device 1.

In the present embodiment, eight propellers (rotors) 51, 52, 53, 54, 55, 56, 57, and 58 facing downward and two propulsion propellers 36 and 37 facing backward are attached to the airframe 19. Hereinafter, the plurality of propellers 51, 52, 53, 54, 55, 56, 57, and 58 may be referred to as propellers 8 when not distinguished from each other.

The propellers 8 are attached to the airframe 19 via attachment members (not shown). Electric motors 7 (see FIG. 2) are attached to bases (rotating shafts) of the propellers 8. The electric motors 7 drive the propellers 8. The electric motors 7 are, for example, brushless DC motors. The propellers 8 are fixed wings of blades that rotate about an axis parallel to the direction of gravity when the aircraft 10 is in a horizontal posture.

The propulsion propellers 36 and 37 are attached to a rear of the aircraft 10. The propulsion propellers 36 and 37 are attached to the airframe 19 via attachment members (not shown). Electric motors 7 (see FIG. 2) for driving the propulsion propellers 36 and 37 are attached to bases (rotating shafts) of the propulsion propellers 36 and 37. The propulsion propellers 36 and 37 are fixed wings of blades that rotate about an axis that intersects the direction of gravity (for example, an axis along the longitudinal direction of the aircraft 10) when the aircraft 10 is in a horizontal posture.

The aircraft 10 flies in a desired flight state by rotating the propellers 8 and the propulsion propellers 36 and 37 according to a control signal. The control signal is a signal for controlling the aircraft 10 based on an operator's operation or an autopilot instruction. The aircraft 10 flies, for example, by rotating the propellers 51, 54, 55, and 58 in a first direction (for example, clockwise) and rotating the propellers 52, 53, 56, and 57 in a second direction (for example, counterclockwise).

Figure 2:
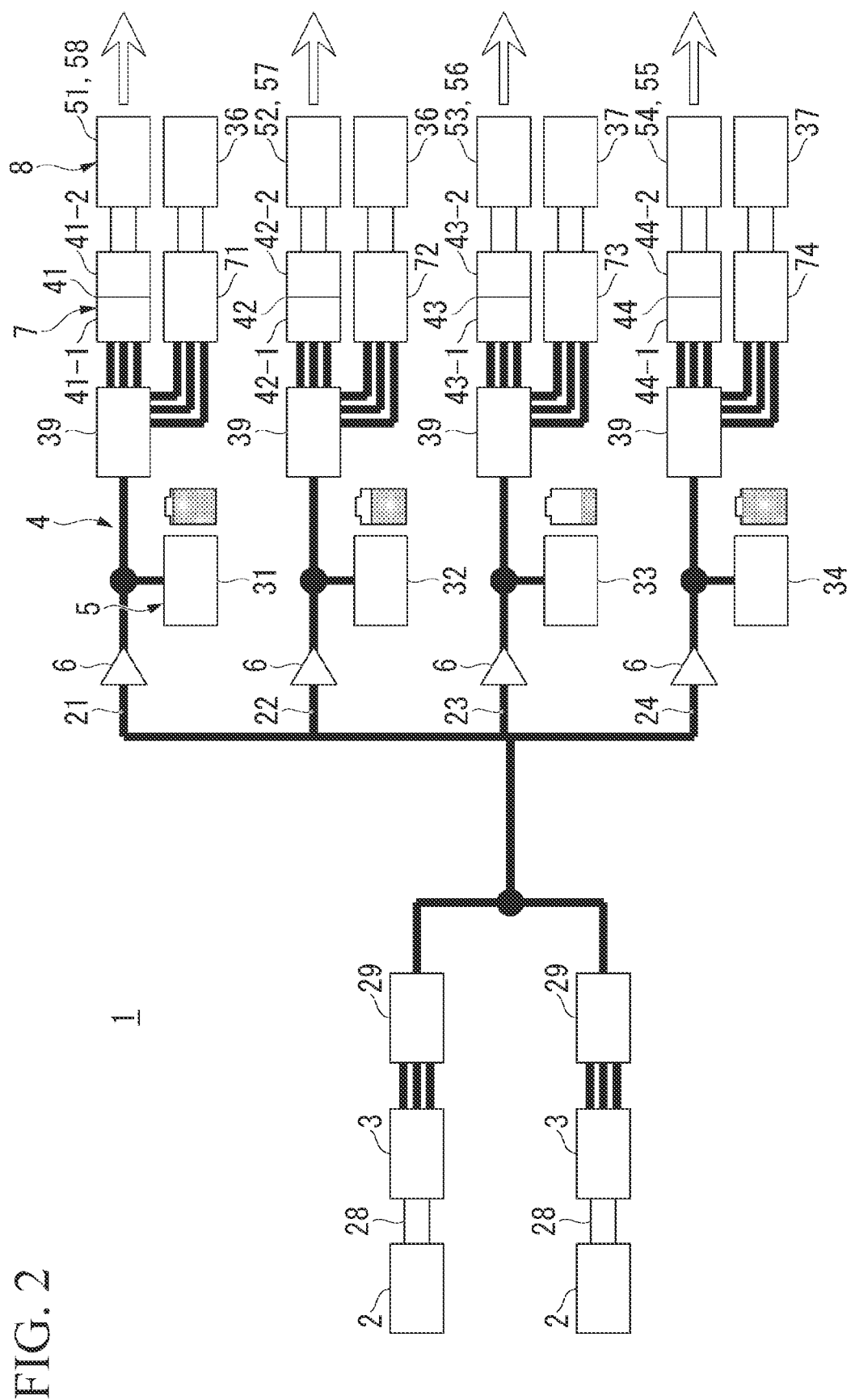
FIG. 2 is a schematic configuration diagram of the power supply device according to the embodiment.

FIG. 2 is a schematic configuration diagram of the power supply device 1 according to the embodiment.

As shown in FIG. 2, the power supply device 1 is provided in the aircraft 10 described above. The power supply device 1 is used as a power source for the aircraft 10. The power supply device 1 includes a drive source 2, a power generator 3, a plurality of power supply lines 4, a plurality of batteries 5, diodes 6, the electric motors 7 (electrical loads in the claims), the propellers 8 described above, and a control unit 9 (see FIG. 3).
(Drive Source)

The drive source 2 is a so-called gas turbine engine. A plurality of (two in the present embodiment) drive sources 2 are provided. Since the configurations of the two drive sources 2 are the same, the following description will refer to one drive source 2 as an example. The drive source 2 includes a compressor, a turbine, and a rotating shaft connecting the compressor and the turbine (none of which is shown). The compressor compresses intake air drawn from a ventilation hole (not shown) provided in the airframe of the aircraft 10. The turbine is connected to the compressor and rotates together with the compressor. A starter motor is connected to the drive source 2. When the drive source 2 is started, the starter motor is first driven by power from the batteries 5 which will be described later. Thus, the drive source 2 is started by torque received from the starter motor.

(Power Generator)

A number of (two in the present embodiment) power generators 3 corresponding to the number of drive sources 2 are provided. Since the configurations of the two power generators 3 are the same, the following description will refer to one power generator 3 as an example. The power generator 3 is connected to the drive source 2 via a transmission shaft 28 and a speed reduction mechanism (not shown). The power generator 3 is disposed on the turbine side in an axial direction of the drive source 2. The power generator 3 is provided coaxially with the drive source 2. The power generator 3 generates power (AC power) by driving the drive source 2. The AC power generated by the power generator 3 is converted into DC power by a converter 29 of a power drive unit (PDU) (not shown) and stored in the batteries 5 via the power supply lines 4.

(Power Supply Line)

The power supply lines 4 are connected to each of the plurality of power generators 3 via a converter 29. Each power supply line 4 supplies the power generated by the power generators 3 to a corresponding one(s) of a plurality of electric motors 7 (electrical loads). A plurality of (four in the present embodiment) power supply lines 4 are provided. The power generated by the power generators 3 is first combined and then distributed and supplied to four power supply lines 21, 22, 23, and 24 at a predetermined ratio according to a signal from the control unit 9 (see FIG. 3). Specifically, the power generated by the power generators 3 is preferentially supplied to a battery 5 provided on a power supply line 4 with a lower charge level. For example, by connecting the batteries 5 and the diodes 6, power is preferentially (more) supplied to a battery 5 with a lower charge level. The power supply lines 4 include a first power supply line 21, a second power supply line 22, a third power supply line 23, and a fourth power supply line 24. A diode 6, electric motors 7, and predetermined propellers 8 are connected to each power supply line 4.

The first power supply line 21 is used as a power supply line 4 for driving the first and eighth propellers 51 and 58 among the eight propellers 8 and the propulsion propeller 36. That is, the first and eighth propellers 51 and 58 and the propulsion propeller 36 are driven by power supplied to the first power supply line 21.

The second power supply line 22 is used as a power supply line 4 for driving the second and seventh propellers 52 and 57 among the eight propellers 8 and the propulsion propeller 36. That is, the second and seventh propellers 52 and 57 and the propulsion propeller 36 are driven by power supplied to the second power supply line 22.

The third power supply line 23 is used as a power supply line 4 for driving the third and sixth propellers 53 and 56 among the eight propellers 8 and the propulsion propeller 37. That is, the third and sixth propellers 53 and 56 and the propulsion propeller 37 are driven by power supplied to the third power supply line 23.

The fourth power supply line 24 is used as a power supply line 4 for driving the fourth and fifth propellers 54 and 55 among the eight propellers 8 and the propulsion propeller 37. That is, the fourth and fifth propellers 54 and 55 and the propulsion propeller 37 are driven by power supplied to the fourth power supply line 24.

(Battery)

One battery 5 is provided for each power supply line 4. A plurality of (four in the present embodiment) batteries 5 are provided. Specifically, the batteries 5 include a first battery 31, a second battery 32, a third battery 33, and a fourth battery 34. The first battery 31 is provided on the first power supply line 21. The second battery 32 is provided on the second power supply line 22. The third battery 33 is provided on the third power supply line 23. The fourth battery 34 is provided on the fourth power supply line 24. The batteries 5 are provided upstream of the electric motors 7 in the power supply direction. Each battery 5 stores surplus power that has not been supplied to the electric motors 7 out of the power generated by the power generators 3. On the other hand, when the power generated by the power generators 3 is insufficient for the output of the electric motors 7, the electric motors 7 are driven by power from the batteries 5.

In the present embodiment, the configurations (ratings) of the batteries 5 are the same. For example, the capacities and maximum C-rates of the four batteries are the same in the present embodiment. However, since the demanded power or power consumption differs for each power supply line 4, the charge levels, C-rates, power consumptions (discharge levels), or the like of the batteries 5 at a certain moment are not necessarily the same.

(Diode)

One diode 6 is provided for each power supply line 4. That is, a plurality of (four in the present embodiment) diodes 6 are provided. The diodes 6 are provided upstream of the batteries 5 on the power supply lines 4 in the power supply direction. Each diode 6 uses power from a battery 5 provided on a corresponding power supply line 4. That is, when the voltage of a battery 5 drops, the voltage of a diode 6 provided on the same power supply line 4 as that having the battery 5 also drops. Accordingly, power from the power generators is preferentially supplied to a power supply line 4 having a diode 6 with a lower voltage. The diodes 6 basically allow power to flow through the power supply lines 4 in only one direction from upstream to downstream. That is, the diodes 6 block the reverse flow of power from the batteries 5. Thus, power is not transferred between the plurality of batteries 5 while the power generators 3 are generating power.

On the other hand, the diodes 6 allow power to flow from downstream to upstream through the power supply lines 4 according to a control signal when the drive sources 2 are started. This allows the starter motors connected to the drive sources 2 to be driven using power from the batteries 5.

(Electric Motor)

Electric motors 7 are provided on each power supply line 4. Electric motors 7 are connected to each battery 5 via an inverter 39. Specifically, first electric motors 41 (more specifically, first electric motors 41-1 and 41-2) are provided on the first power supply line 21. Second electric motors 42 (more specifically, second electric motors 42-1 and 42-2) are provided on the second power supply line 22. Third electric motors 43 (more specifically, third electric motors 43-1 and 43-2) are provided on the third power supply line 23. Fourth electric motors 44 (more specifically, fourth electric motors 44-1 and 44-2) are provided on the fourth power supply line 24. Thus, in the present embodiment, two electric motors 7 are provided on each power supply line 4. The electric motors 7 are provided downstream of the batteries 5 in the power supply direction. Each electric motor 7 rotates a propeller 8 of the aircraft 10 with at least one of power from the power generators 3 and power from the battery 5. The configurations of the electric motors 7 are the same.

The electric motors 7 include four electric propulsion motors 71, 72, 73, and 74 in addition to the above. The electric propulsion motor 71 is provided on the first power supply line 21. The electric propulsion motor 72 is provided on the second power supply line 22. The electric propulsion motor 73 is provided on the third power supply line 23. The electric propulsion motor 74 is provided on the fourth power supply line 24. The electric propulsion motors 71 and 72 rotate the propulsion propeller 36. The electric propulsion motors 73 and 74 rotate the propulsion propeller 37.

(Propeller)

Each propeller 8 is connected to a predetermined electric motor 7 that has been determined in advance. Each propeller 8 is driven by power from a predetermined power supply line 4.

As described above, the first and eighth propellers 51 and 58 are connected to the first electric motors 41 and rotate about the rotation axes as the first electric motors 41 are driven. More specifically, the first propeller 51 is connected to the first electric motor 41-1 and the eighth propeller 58 is connected to the first electric motor 41-2. The second and seventh propellers 52 and 57 are connected to the second electric motors 42 and rotate about the rotation axes as the second electric motors 42 are driven. More specifically, the second propeller 52 is connected to the second electric motor 42-1 and the seventh propeller 57 is connected to the second electric motor 42-2. The third and sixth propellers 53 and 56 are connected to the third electric motors 43 and rotate about the rotation axes as the third electric motors 43 are driven. More specifically, the third propeller 53 is connected to the third electric motor 43-1 and the sixth propeller 56 is connected to the third electric motor 43-2. The fourth and fifth propellers 54 and 55 are connected to the fourth electric motors 44 and rotate about the rotation axes as the fourth electric motors 44 are driven. More specifically, the fourth propeller 54 is connected to the fourth electric motor 44-1 and the fifth propeller 55 is connected to the fourth electric motor 44-2.

The propulsion propeller 36 is connected to the electric propulsion motors 71 and 72. As the electric propulsion motors 71 and 72 are driven, the propulsion propeller 36 rotates to generate a horizontal propulsion force.

The propulsion propeller 37 is connected to the electric propulsion motors 73 and 74. As the electric propulsion motors 73 and 74 are driven, the propulsion propeller 37 rotates to generate a horizontal propulsion force.

(Control Unit)

Figure 3:
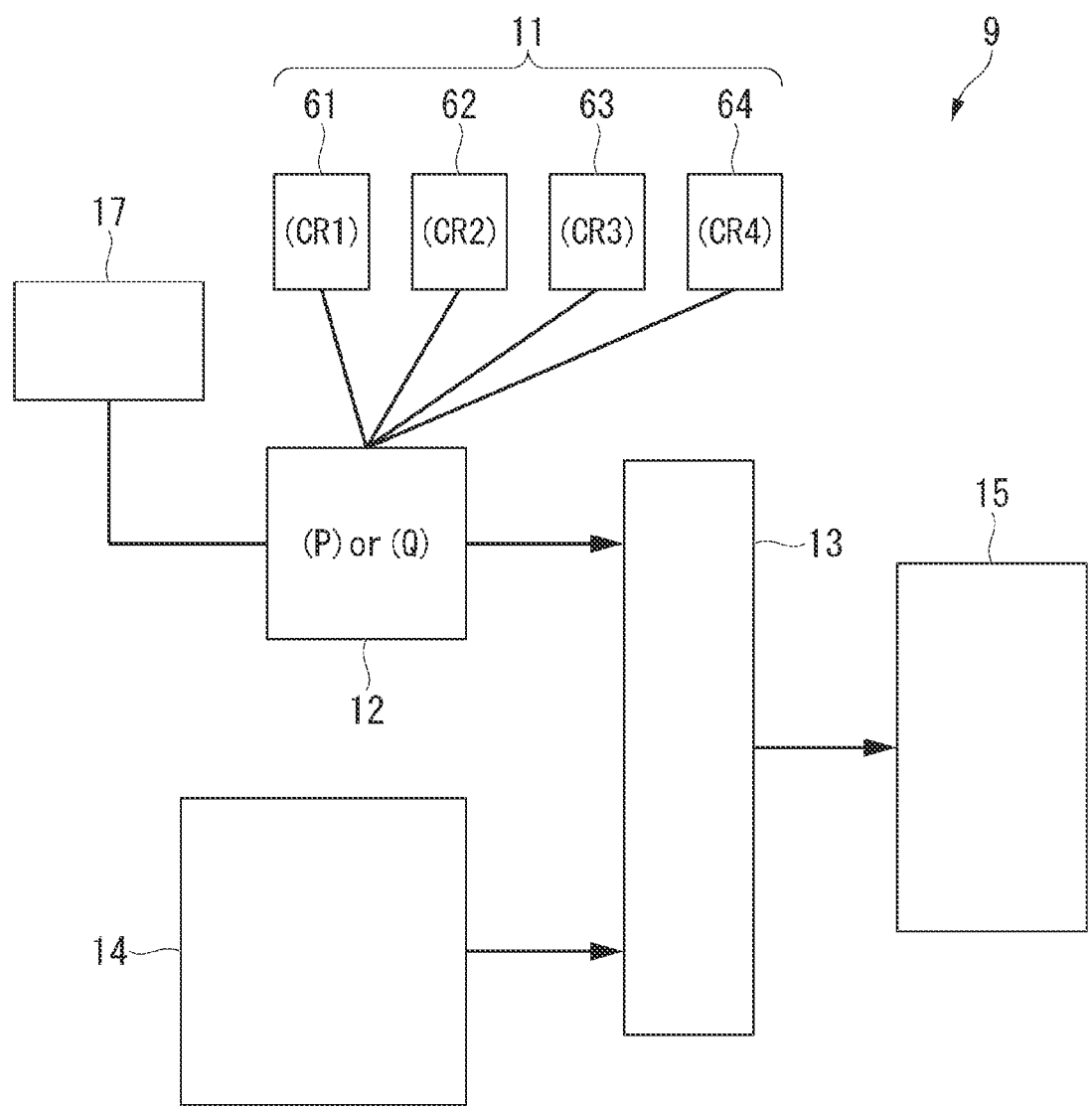
FIG. 3 is a control block diagram of the power supply device according to the embodiment.

FIG. 3 is a control block diagram of the power supply device 1 according to the embodiment.

The control unit 9 controls the output of the gas turbine engines to control power to be generated by the power generators 3. Control for determining power generated by the power generators 3 based on the capacities of the batteries 5, the C-rates of the batteries 5, and the demanded power of the electric motors 7 when an output request has been issued for each electric motor 7 (each propeller 8) will be described in the following description. The control unit 9 may also perform various controls, for example, when the power generators 3 do not generate power, when the aircraft 10 takes off and lands, and when the aircraft 10 is cruising.

As shown in FIG. 3, the control unit 9 includes a current value calculation part 11, a demanded battery power calculation part 12, an operating state detection part 17, a demanded power output unit 14, a power summation part 13, and a power generator ECU 15.

The current value calculation part 11 calculates a current value that can be passed through each battery 5 (hereinafter sometimes simply referred to as a "C-rate") based on the charge level of the battery 5. Specifically, the current value calculation part 11 first detects the charge level of each battery 5. For example, the voltage at the terminals of the battery 5 is measured and the charge level of the battery 5 is uniquely determined from the measured voltage. For example, a so-called coulomb counting method (a current integration method) in which the charge level of the battery 5 is estimated based on an integrated value of the charge/discharge current of the battery 5 may be used as a method for detecting the charge level of the battery 5.

Next, the current value calculation part 11 calculates the C-rate of each battery 5 based on the detected charge level of the battery 5. The current value calculation part 11 includes a first current value calculation part 61, a second current value calculation part 62, a third current value calculation part 63, and a fourth current value calculation part 64.

The first current value calculation part 61 calculates a C-rate CR1 of the first battery 31. The C-rate CR1 of the first battery 31 is a value uniquely determined according to the charge level of the first battery 31.

The second current value calculation part 62 calculates a C-rate CR2 of the second battery 32. The C-rate CR2 of the second battery 32 is a value uniquely determined according to the charge level of the second battery 32.

The third current value calculation part 63 calculates a C-rate CR3 of the third battery 33. The C-rate CR3 of the third battery 33 is a value uniquely determined according to the charge level of the third battery 33.

The fourth current value calculation part 64 calculates a C-rate CR4 of the fourth battery 34. The C-rate CR4 of the fourth battery 34 is a value uniquely determined according to the charge level of the fourth battery 34.

The demanded battery power calculation part 12 calculates a demanded power P of the batteries 5 based on the current values (C-rates) calculated by the current value calculation part 11 and the capacities BA of the batteries 5. The demanded battery power calculation part 12 calculates the demanded power P by multiplying a value obtained by adding the C-rates calculated by the current value calculation part 11 by the battery capacity BA of each battery ($P = BA \times (CR1 + CR2 + CR3 + CR4)$).

The operating state detection part 17 is connected to the power supply lines 4. The operating state detection part 17 is connected to the demanded battery power calculation part 12. The operating state detection part 17 detects the operating states of the plurality of power supply lines 4 and outputs the detection results to the demanded battery power calculation part 12. The operating state detection part 17 detects an operating state including, for example, the presence or absence of a problem (such as a defect or a failure), of the battery 5 on each power supply line 4.

The control unit 9 controls the amount of power to be generated by the power generators 3 based on the operating states of the power supply lines 4 detected by the operating state detection part 17. Specifically, in the present embodiment, the demanded battery power calculation part 12 calculates a second demanded power Q of the batteries 5 based on the detection results from the operating state detection part 17 in addition to the C-rates and the capacities BA of the batteries 5 described above. While the demanded power P of the batteries 5 is the demanded power of the batteries 5 when all power supply lines 4 (batteries 5) are normal, the second demanded power Q of the batteries 5 is the demanded power of the batteries 5 when a problem has occurred in at least one of the power supply lines 4 (the batteries 5). That is, the demanded power P is the demanded power of the batteries 5 calculated when the system is functioning normally and the second demanded power Q is the demanded power of the batteries 5 calculated when the system is not functioning normally.

For example, when a problem has occurred in only the first battery 31 among the plurality of batteries 5, the demanded battery power calculation part 12 calculates the second demanded power Q of the batteries 5 instead of the demanded power P of the batteries 5 described above. The demanded battery power calculation part 12 calculates the second demanded power Q by multiplying a value obtained by adding C-rates (CR2, CR3 and CR4) of batteries that have been determined to be normal (the second third, and fourth batteries 32, 33, and 34 here) among the C-rates calculated by the current value calculation part 11 by the battery capacity BA of each battery (Q=BA×(CR2+CR3+CR4)).

The demanded battery power calculation part 12 selects one of the demanded power P and the second demanded power Q described above as the demanded power of the batteries 5. More specifically, when all power supply lines 4 are operating normally, the demanded battery power calculation part 12 selects the demanded power P as the demanded power of the batteries 5. On the other hand, when at least one of the plurality of power supply lines 4 is not operating normally, the demanded battery power calculation part 12 selects the second demanded power Q as the demanded power of the batteries 5. The demanded battery power calculation part 12 outputs the selected demanded power (P or Q) of the batteries 5 to the power summation part 13 which will be described later.

The demanded power output unit 14 detects a demanded power of the airframe 19 and outputs it to the power summation part 13 that will be described later. The demanded power of the airframe 19 is the sum of the demanded powers of the electric motors 7 of the power supply lines 4. Specifically, the demanded power output unit 14 outputs a first demanded power E1 which is the demanded power of the first electric motor 41 on the first power supply line 21, a second demanded power E2 which is the demanded power of the second electric motor 42 on the second power supply line 22, a third demanded power E3 which is the demanded power of the third electric motor 43 on the third power supply line 23, and a fourth demanded power E4 which is the demanded power of the fourth electric motor 44 on the fourth power supply line 24. Further, the demanded power output unit 14 adds the detected demanded powers E1, E2, E3, and E4 to calculate a demanded power sum E5 as the demanded power of the airframe 19 (E5=E1+E2+E3+E4).

The power summation part 13 sums the demanded power (P or Q) of the batteries calculated by the demanded battery power calculation part 12 and the demanded power sum E5 calculated by the demanded power output unit 14 which is power demanded by the electric motors 7. The power summation part 13 sets the power obtained by adding the demanded power (P or Q) of the batteries and the demanded power sum E5 of the electric motors 7 as a target generated power.

The power generator ECU 15 controls the driving of the drive sources 2 to control the power to be generated by the power generators 3. The target generated power calculated by the power summation part 13 is input to the power generator ECU The power generator ECU 15 controls the drive sources 2 such that the power generators 3 generate the target generated power calculated by the power summation part 13.

Part of the power generated by the power generators 3 is supplied to the power supply lines 4 according to power demanded by the electric motors 7. The remaining part of the power generated by the power generators 3 is distributed to the power supply lines 4 and charged to the batteries 5 such that a battery 5 with a lower charge level is charged preferentially (more). Thus, it is possible to restore or maintain the charge level of each battery 5 while satisfying the demanded output.

Figure 4:
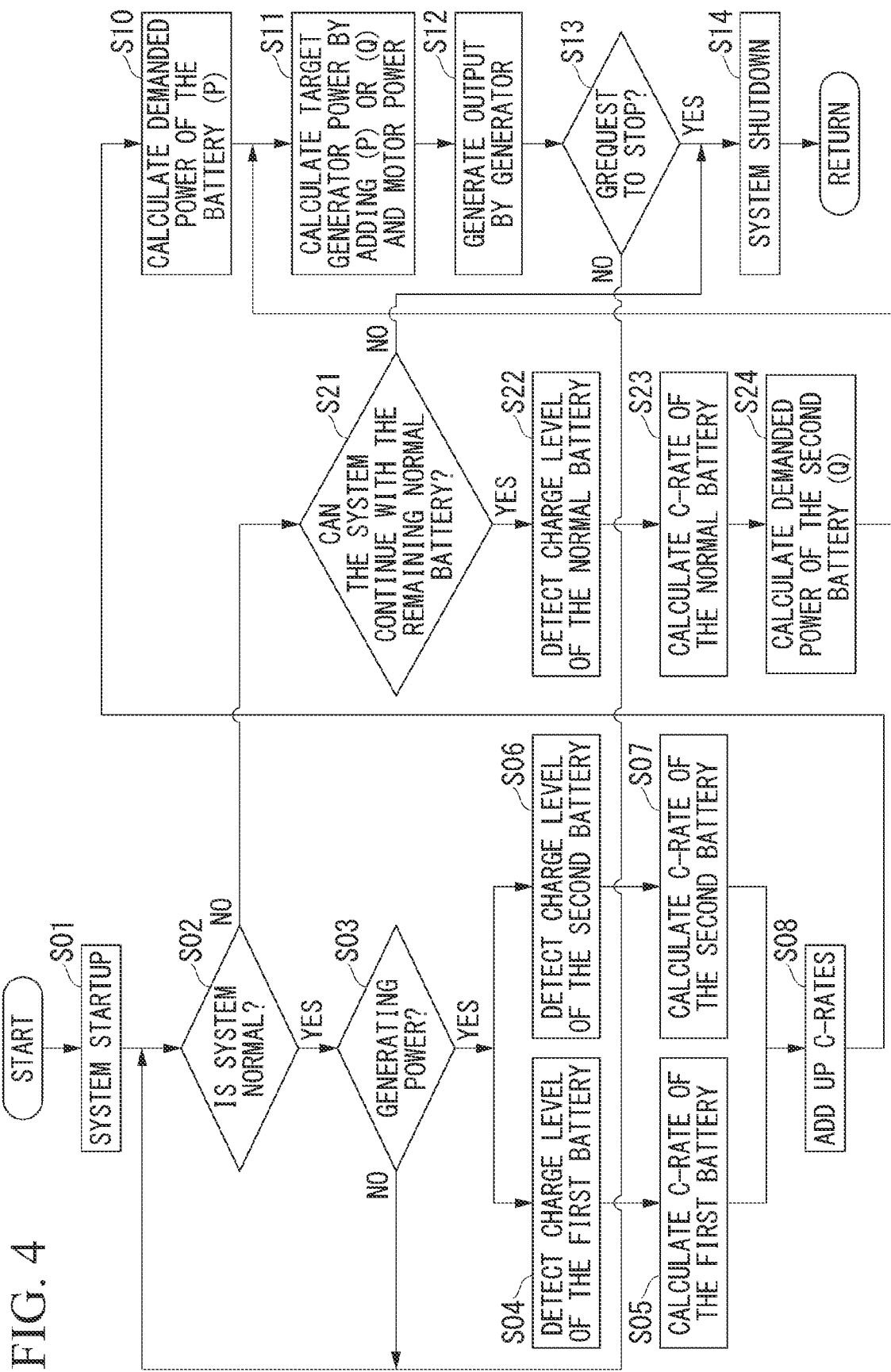
FIG. 4 is a flowchart showing a flow of control in the power supply device.

FIG. 4 is a flowchart showing a flow of control in the power supply device 1. The control performed by the control unit 9 of the power supply device 1 will be described in detail below with reference to FIG. 4.

First, the control unit 9 activates the system (step S01). Next, the control unit 9 determines whether the system is normal (step S02). The system being normal indicates a state in which no defects are found in any of the plurality of power supply lines 4, more specifically, the batteries 5 on the power supply lines 4, and the batteries 5 are functioning normally.

If the system is normal (YES in step S02), it is determined whether power is being generated by the power generators 3 (step S03). If power is not being generated (NO in step S03), the process returns to step S02 and waits until the system is normal and power is being generated. If it is determined that power is being generated (YES in step S03), the current value calculation part 11 calculates the charge level and C-rate of each battery 5. Specifically, the first current value calculation part 61 detects the charge level of the first battery 31 (step S04) and calculates the C-rate CR1 of the first battery 31 from the detected charge level (step S05). The second current value calculation part 62 detects the charge level of the second battery 32 (step S06) and calculates the C-rate CR2 of the second battery 32 from the detected charge level (step S07). Similarly, although not shown in FIG. 4, the third current value calculation part 63 detects the charge level of the third battery 33 and calculates the C-rate CR3 of the third battery 33 from the detected charge level. The fourth current value calculation part 64 detects the charge level of the fourth battery 34 and calculates the C-rate CR4 of the fourth battery 34 from the detected charge level. Although the configuration of the present embodiment shown in FIG. 4 has been described with respect to an example in which the charge levels and C-rates of the batteries 5 are detected and calculated in parallel, the charge levels and C-rates of the batteries 5 may be detected and calculated in order from the first battery 31 to the fourth battery 34.

When the C-rates of all batteries 5 have been calculated, the demanded battery power calculation part 12 adds up the calculated C-rates (step S08). Further, the demanded battery power calculation part 12 calculates the demanded battery power P by multiplying the sum of the added C-rates by the battery capacity BA of each battery (step S10). After the process of step S10 is completed, the process proceeds to step S11.

Here, if it is determined that the system is not normal in step S02 (NO in step S02), the process proceeds to step S21. In step S21, it is detected which battery 5 is defective. Specifically, in the present embodiment, it is detected which of the first battery 31, the second battery 32, the third battery 33, and the fourth battery 34 is defective. In step S21, if it is detected that a battery 5 is defective, it is determined whether the active state of the system can continue with the remaining normal batteries (for example, whether the airframe 19 can fly). For example, if only one of the four batteries 5 is defective, the control unit 9 determines that the system can continue with the remaining three batteries 5 and proceeds to step S22. On the other hand, for example, if two or more of the four batteries 5 are defective, the control unit 9 determines that the system cannot continue with only the remaining batteries 5. In this case, the process proceeds to step S14 to stop the system and terminate this flow.

After proceeding to step S22, the control unit 9 next detects the charge levels of the remaining batteries 5 that have been determined to be normal (step S22). Further, the control unit 9 calculates the C-rates of the normal batteries 5 based on the detected charge levels of the normal batteries 5 (step S23). Next, the control unit 9 calculates a second demanded power Q of the batteries 5 based on the calculated C-rates of the batteries 5 and the capacities of the batteries 5 (step S24) and proceeds to step S11.

In step S11, a target generated power is calculated by adding the demanded power P of the batteries 5 calculated in step S10 or the second demanded power Q of the batteries 5 calculated in step S24 and the demanded power E5 of the airframe 19 calculated by the demanded power output unit 14 (that is, the power to be supplied to the electric motors 7). Here, the control unit 9 can record, for example, the result of determining whether the system is normal in step S02, and if it is determined that the system is normal in step S02, uses the demanded power P of the batteries 5 to calculate the target generated power in step S11. On the other hand, for example, if it is determined that the system is not normal in step S02, the control unit 9 uses the second demanded power Q of the batteries 5 to calculate the target generated power in step S11.

Next, the power generator ECU 15 controls the driving of the drive sources 2 to drive the power generators 3 to perform power generation through the power generators 3 (step S12). At this time, the power generator ECU 15 drives the power generators 3 such that the power generated by the power generators 3 matches the target generated power.

When power generation by the power generators 3 has been completed, it is determined whether a stop request has been issued from the system (step S13). If a stop request has been issued (YES in step S13), the system is stopped (step S14) and this control flow ends. On the other hand, if no stop request has been issued (NO in step S13), the process returns to step S02 and repeats the control flow described above.

Although the system is stopped if two or more of the four batteries 5 are defective in step S21 in the above embodiment, the condition for whether to stop the system (the condition for whether to determine YES or NO in step S21) is not limited to this. A threshold for the number of batteries 5 for stopping the system may also be set to one, three, or the like. For example, a setting may be made in advance such that the determination of step S21 changes depending on the combination of batteries 5 which are defective. The determination of step S21 may also be made according to conditions other than the number of batteries 5 which are defective.

(Operations and Advantages)

Next, the operations and advantages of the power supply device 1 described above will be described.

According to the power supply device 1 of the present embodiment, power generated by the power generators 3 is supplied to the plurality of batteries 5 through the power supply lines 4. The power supply device 1 includes the current value calculation part 11 that calculates current values that can be passed through the batteries 5, the demanded battery power calculation part 12 that calculates the demanded power (P or Q) based on the battery capacity and the current values calculated by the current value calculation part 11, and the power summation part 13 that sums the demanded power (P or Q) and power demanded by the electric motors (electrical loads) 7. The drive sources 2 are controlled such that the power generators 3 generate the power calculated by the power summation part 13. Accordingly, it is possible to easily calculate power to be generated by the power generators 3 (a target generated power) based on current values that can be passed through the batteries 5 and the battery capacity. In the power supply device 1, the power generated by the power generators 3 is distributed to the power supply lines 4 according to the potential differences of the batteries 5. Thus, the plurality of batteries 5 can be charged such that the charge levels of the batteries 5 are uniform regardless of the potential differences of the batteries 5. Further, even if the outputs (power consumption) of the electric motors 7 on the power supply lines 4 differ from each other, a battery 5 with a lower charge level can be charged preferentially. This can increase the output of an electric motor 7 connected to the same power supply line 4 as that having the battery 5 with a lower charge level. As a result, the outputs of the power supply lines 4 can be balanced and variations in the outputs of the electric motors 7 can be corrected. That is, the charge levels of the batteries 5 can be balanced regardless of the outputs of the electric motors 7. Thus, stable control becomes possible.

For example, a control device or the like for managing (controlling) charging and discharging of each battery 5 becomes unnecessary in contrast to the related art in which charging and discharging is controlled for each battery 5. This can reduce the cost of the power supply device 1. Thus, the charge levels of the plurality of batteries 5 can be balanced with a simpler and less expensive configuration than the related art.

Accordingly, it is possible to provide the power supply device 1 capable of balancing the charge levels of the plurality of batteries 5 while limiting complication of the control system compared to the related art.

Since a battery 5 with a lower charge level is charged preferentially, overdischarging of the battery 5 with a lower charge level can be limited. Since power supply to a battery 5 with a relatively large charge level is limited, overcharging of the battery 5 with the relatively large charge level can be limited. Accordingly, the batteries 5 can be used within an optimal usage range and deterioration of the battery 5 can be limited.

Further, since power is not transferred between the plurality of batteries 5, complication of the control system can be limited compared to the related art in which power is transferred between the batteries 5. Controlling the charging and discharging of the batteries 5 only with power from the power generators 3 without transferring power between the batteries 5 can improve the efficiency of charging and discharging.

The power supply device 1 further includes the operating state detection part 17 that detects the operating states of the power supply lines 4, and the power to be generated by the power generators 3 is controlled based on the operating states of the power supply lines 4. Thus, for example, when a problem such as a failure has occurred in one of the batteries 5, it is possible to limit power supply to a power supply line 4 in which the problem has occurred. Further, performing control or the like for subtracting the amount of power for the power supply line 4 to which power supply has been stopped from the power to be generated can limit overcharging of the normal power supply lines 4. Accordingly, it is possible to provide the power supply device 1 with high versatility that can cope with accidents or problems such as failures.

The power supply device 1 is a power source for the electrically propelled aircraft 10 and the electrical loads are electric motors 7 that rotate propellers 8 of the aircraft 10. Thus, the power supply device 1 is used as a power source for the electrically propelled aircraft 10. Here, in the aircraft 10 that flies by rotating the plurality of propellers 8, power consumed by each power supply line 4 tends to vary greatly depending on the weather, the attitude of the aircraft, and the like. Therefore, the power supply device 1 can be used more preferably, especially when the power supply device 1 is applied to an aircraft 10 having a large difference between powers demanded by the electric motors on the power supply lines 4. That is, power can be supplied according to the power consumption of each power supply line 4 or the like including a battery 5.

Since power from the power generators 3 is distributed according to the demanded power of each power supply line 4, control of the aircraft 10 can be facilitated.

The technical scope of the present invention is not limited to the embodiments described above and various modifications can be made without departing from the spirit of the present invention.

In each embodiment described above, the four power supply lines 4 are connected to each of the two power generators 3, but the present invention is not limited to this. For example, two power supply lines 4 may be connected to each of the power generators 3. That is, the first and second power supply lines 21 and 22 may be connected to one of the two power generators 3 and the third and fourth power supply lines 23 and 24 may be connected to the other of the two power generators 3. In this case, the first and second power supply lines 21 and 22 may be independent of the third and fourth power supply lines 23 and 24.

The number of power generators 3 or drive sources 2 is not limited to two. Similarly, the number of propellers 8 is not limited to eight. The combinations of propellers 8 and power supply lines 4 are not limited to those of the above embodiment. The diodes 6 may not be provided. When the diodes 6 are not provided, for example, power supply may be controlled to regulate the transfer of power between the batteries 5.

In the above embodiment, the demanded power of the airframe 19 is calculated by summing the demanded powers of the first to fourth electric motors 41, 42, 43, and 44, but the present invention is not limited to this. For example, the demanded power of the airframe 19 may be calculated by adding the sum of the demanded powers of the first to fourth electric motors 41, 42, 43, and 44 and the sum of the demanded powers of the four electric propulsion motors 71, 72, 73, and 74.

The batteries 5 may have different capacities or ratings. In this case, after calculating the C-rates of the batteries 5, the demanded power P may be calculated by multiplying the C-rates of the batteries 5 by the capacities and adding the C-rates multiplied by the capacities. That is, when the capacities of the first battery 31, the second battery 32, the third battery 33, and the fourth battery 34 are BA1, BA2, BA3, and BA4, respectively, the demanded power P may be calculated using equation $P=BA1\times CR1+BA2\times CR2+BA3\times CR3+BA4\times CR4$. The same applies to the second demanded power Q.

The first current value calculation part 61, the second current value calculation part 62, the third current value calculation part 63, and the fourth current value calculation part 64 may be integrated. That is, the C-rates (CR1, CR2, CR3 and CR4) of the batteries 5 may be calculated by a single current value calculation part 11.

The operating state detection part 17 may be omitted. However, the configuration of the present embodiment having the operating state detection part 17 is superior in that performing control using the detection results of the operating state detection part 17 can limit overcharging and improve versatility.

The above embodiment has been described with respect to the case where a problem has occurred only in the first battery 31 as an example, but the present invention is not limited to this. For example, when a problem has occurred only in the second battery 32, the second demanded power Q may be calculated using the C-rates of the batteries other than the second battery 32 (in which case $Q=BA\times(CR1+CR3+CR4)$). Similarly, when a problem has occurred only in the third battery 33, the second demanded power Q may be calculated using the C-rates of the batteries other than the third battery 33 (in which case $Q=BA\times(CR1+CR2+CR4)$). Similarly, when a problem has occurred only in the fourth battery 34, the second demanded power Q may be calculated using the C-rates of the batteries other than the fourth battery 34 (in which case $Q=BA\times(CR1+CR2+CR3)$).

For example, when a problem has occurred in the first and second batteries 31 and 32, the second demanded power Q may be calculated using the C-rates of the batteries other than the first and second batteries 31 and 32 (in which case $Q=BA\times(CR3+CR4)$). The same applies to other combinations.

In the above embodiment, the C-rate of a battery 5 in which a problem has occurred is excluded in calculating the second demanded power Q, but the present invention is not limited to this. For example, the C-rates may be corrected according to the states of the power supply lines 4, for example, by multiplying the C-rates by coefficients (K1, K2, K3 and K4) according to the operating states of the power supply lines 4. That is, the second demanded power Q may be calculated such that $Q=BA\times(K1CR1+K2CR2+K3CR3+K4CR4)$. Here, the coefficients K1 to K4 may be values that change depending on the operating states of the power supply lines 4. The coefficients K1 to K4 may be values set in advance or may be values that appropriately change by machine learning or the like.

Also, without departing from the scope of the present invention, the components in the embodiments described above may be appropriately replaced with well-known ones and the embodiments described above may be combined as appropriate.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

EXPLANATION OF REFERENCES

1 Power supply device
2 Drive source
3 Power generator

4 Power supply line
5 Battery
7 Electric motor (electrical load)
8 Propeller
10 Aircraft
11 Current value calculation part
12 Demanded battery power calculation part
13 Power summation part
17 Operating state detection part
BA, BA1, BA2, BA3, and BA4 Battery capacity
CR1, CR2, CR3, and CR4 C-rate (current value that can be passed through battery
P, Q Demanded power of batteries

What is claimed is:

1. A power supply device comprising:
a power generator;
a drive source configured to drive the power generator;
a plurality of power supply lines that supply the power generated by the power generator to a plurality of electrical loads;
a plurality of batteries connected to the power supply lines, the plurality of batteries being upstream of the electrical loads in a power supply direction;
a current value calculation part configured to calculate current values that can be passed through the batteries based on charge levels of the batteries;
a demanded battery power calculation part configured to calculate a demanded power of the batteries based on the current values calculated by the current value calculation part and capacities of the batteries; and
a power summation part configured to sum the power calculated by the demanded battery power calculation part and power demanded by the electrical loads,
wherein the drive source is controlled such that the power generator generates power calculated by the power summation part.

2. The power supply device according to claim 1, further comprising an operating state detection part configured to detect operating states of the plurality of power supply lines,
wherein the amount of power to be generated by the power generator is controlled based on the operating states of the power supply lines detected by the operating state detection part.

3. The power supply device according to claim 1, wherein the power supply device is a power source for an electrically propelled aircraft, and
each of the electrical loads is an electric motor that rotates a propeller of the aircraft.

4. The power supply device according to claim 2, wherein the power supply device is a power source for an electrically propelled aircraft, and
each of the electrical loads is an electric motor that rotates a propeller of the aircraft.

* * * * *